(12) United States Patent
Anderson

(10) Patent No.: US 6,945,287 B2
(45) Date of Patent: Sep. 20, 2005

(54) COLUMNAR SEAL FOR PARTICLE PROCESSING SYSTEM

(75) Inventor: George E. Anderson, Champlin, MN (US)

(73) Assignee: Crown Iron Works Company, Roseville, MN (US)

(*) Notice: Subject to any disclaimer, the term of this patent is extended or adjusted under 35 U.S.C. 154(b) by 0 days.

(21) Appl. No.: 10/720,298

(22) Filed: Nov. 24, 2003

(65) Prior Publication Data

US 2004/0173279 A1 Sep. 9, 2004

Related U.S. Application Data

(60) Provisional application No. 60/428,398, filed on Nov. 22, 2002.

(51) Int. Cl.[7] ................................................ B65B 1/30
(52) U.S. Cl. ........................... 141/95; 141/94; 141/198; 141/255; 141/302; 222/227; 222/236; 222/265
(58) Field of Search ............................. 141/18, 94, 95, 141/192, 198, 255, 256, 259, 301, 302; 222/56, 57, 71, 227, 229, 236, 265

(56) References Cited

U.S. PATENT DOCUMENTS

| | | | | |
|---|---|---|---|---|
| 4,378,897 A | * | 4/1983 | Kattelmann | 222/56 |
| 4,547,725 A | * | 10/1985 | Oetiker et al. | 324/665 |
| 4,737,316 A | | 4/1988 | Macedo et al. | 252/633 |
| 5,938,983 A | | 8/1999 | Sheaffer et al. | 261/122.1 |
| 6,143,187 A | | 11/2000 | Robertson | 210/786 |

* cited by examiner

Primary Examiner—Timothy L. Maust
(74) Attorney, Agent, or Firm—Nawrocki, Rooney & Sivertson, P.A.

(57) ABSTRACT

A backflow blocker prevents backflow of gas to a lower pressure first stage of a system for processing particles from a downstream higher pressure second stage of the system. The blocker comprises an upright duct connecting the first stage to the second stage. The duct is at least partly filled with a column of particles passing from the first stage to the second stage. By properly selecting the duct dimensions and by controlling the flow rate of particles into and from the duct, the velocity of downwardly moving particles in the duct can be made to exceed the velocity at which the gasses flow through the particles in the duct. This prevents gasses from flowing from the lower pressure downstream stage to the higher pressure upstream stage.

11 Claims, 1 Drawing Sheet

COLUMNAR SEAL FOR PARTICLE PROCESSING SYSTEM

This application claims the benefit of Provisional Application No. 60/428,398, filed Nov. 22, 2002.

BACKGROUND OF THE INVENTION

Particles are frequently modified from one form to another in a continuous multi-stage process. Often, this involves removing a material from the particles, but may also involve chemically altering the particles or a constituent in the particles.

One or more of these stages in such a process may use a processing fluid (liquid or gaseous) to modify the particles. For example, a process for decaffeinating coffee beans requires solvent stages and solvent removal stages to produce the final decaffeinated beans. The solvent, even the same solvent, may be liquid or gaseous at different points in a typical process.

Often, the processing steps upstream of a stage using a processing gas (i.e., gaseous material) will not operate properly if the gas in a downstream stage propagates to upstream stages. For example, the downstream gas may inactivate the upstream stage or even form a toxic or dangerous mixture with either the particles in the form they are at that stage or with a processing fluid in the upstream stage. If an upstream stage uses high heat, a combustible gas used in a downstream stage must not be allowed to backflow to the heated upstream stage.

Accordingly, it is sometimes necessary to prevent backflow from a higher-pressure downstream stage to the immediate upstream stage. One easy way of course is to simply control the gas pressure of each stage so that the gas pressure in each downstream stage is lower than the adjacent upstream stage. However, where a number of stages are involved, this may not be possible. Even if only two stages are involved, the chemistry of the stages' processes may not allow the downstream stage to operate at a lower pressure than the adjacent upstream stage.

A number of mechanical devices are available to oppose such backflow of gasses. However, for the most part, these devices do not totally prevent backflow of gasses. For example, a rotary gate allows some leakage through the gate seals.

If a near perfect seal is required between two stages of a continuous particle process, no system presently available is completely satisfactory.

It is known that a column of particles held in a duct or tube is permeable by a fluid. For example, a liquid poured into the top of a duct holding a column of particles will percolate to the bottom of the duct. The rate of percolation depends in part on characteristics of the particles, but also on how tightly the particles are packed.

Similarly, if a gas pressure difference is created between ends of a duct completely filled with particles, gas will percolate through the column of particles from the higher pressure end to the lower pressure end. The mass rate of gas percolation and the velocity at which the gas percolates depends on how densely packed the particles are, the shape and size of the particles, and the pressure difference.

BRIEF DESCRIPTION OF THE INVENTION

I have discovered a way to use a column of particles undergoing processing while flowing through a series of stages in a continuous manner as a near-perfect seal against backflow.

The invention is a gas backflow blocker useful in processes for treating particles passing in a continuous flow from a first stage of a process to a downstream second stage, where the first stage is held at a pressure lower than that of the second stage. The blocker prevents backflow of gasses from the second stage to the lower pressure first stage.

The blocker comprises an upright duct having an upper end and a lower end, for holding a mass of the particles in a column form as the mass flows through the process. The term "upright" here does not necessarily mean vertical, but instead simply means first of all, that the particle mass completely fills at least a portion of the duct cross section so that backflowing gas must percolate through the particle mass. Secondly, the incline of the duct must be sufficiently steep to allow the particular particle mass composition to easily slide from the first to the second end of the duct, even when the particle mass is immobile for a time.

First and second flow restrictors are mounted at the upper and lower duct ends respectively. The first flow restrictor receives particles flowing from the first stage and meters or limits particle flow into the duct from the first stage. The second flow restrictor receives flow from the duct and meters or limits particle flow from the duct into the second stage. At least one of the flow restrictors has a variable particle flow rate set by a flow rate signal.

A particle level sensor is mounted on the duct adjacent the upper end and provides a level signal indicating the level of particles within the duct. A number of different types of sensing are possible. The sensor may be little more than a lever-activated switch, or can be a capacitive detector, whose dielectric constant changes when particles are present between plates of a capacitor.

A controller receives the level signal and responsive to the level signal value, provides the flow rate signal to the flow restrictor to limit or meter particle flow to maintain a predetermined particle level within the duct.

The pressure difference between the first and second duct ends causes gas to percolate backwards from the second end of the duct to the first end of the duct. However, the velocity at which a gas backflows through a compacted mass of particles completely filling the duct is low compared to the backflow velocity in an unobstructed duct. If the mass of particles flows through the duct from the first stage to the second stage faster than the gas backflows through the particle mass in the duct, then the higher-pressure gas in the second stage cannot reach the first stage.

The column must not lift or fluidize because of the pressure difference. The effective mass density of the particle column, the height of the column, and the pressure difference between the first and second stages controls this factor. If the duct is not vertical, the total duct length may have to be longer. Calculating an adequate duct length may not be possible; instead, the column length will usually have to be determined experientially or empirically.

DESCRIPTION OF THE PREFERRED EMBODIMENTS

Figure 1:
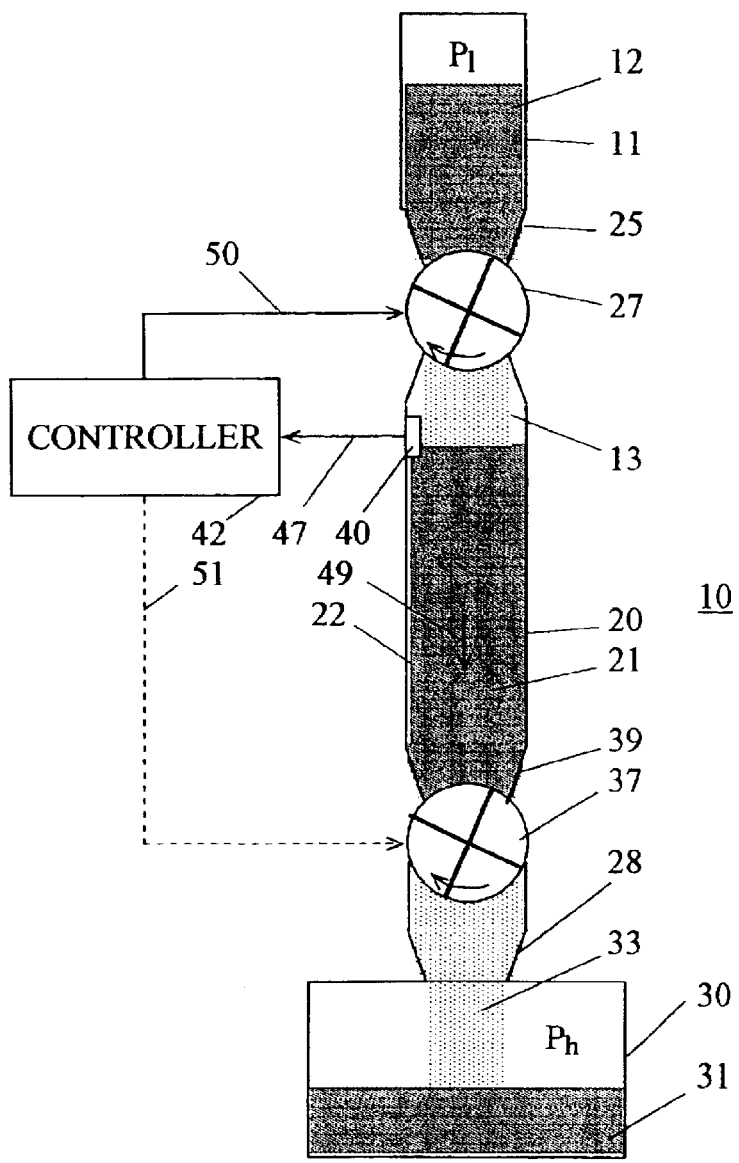
FIG. 1 shows a diagrammatic sketch of a process with structure using the invention.

FIG. 1 shows a section 10 of a complete continuous particle processing system. Section 10 includes a first stage comprising a first particle processing chamber 11 operating at a pressure $P_l$. An immediately following second stage comprises a second particle processing chamber 30 operating at a pressure $P_h$ higher than $P_l$. The first stage is not necessarily the first stage of the system.

Chambers 11, 30 contain particle masses 12, 31 respectively. When the section 10 system is operating, particles are constantly flowing into and from each of chambers 11, 30, so the actual particles forming each of the masses 12, 31 are constantly changing. While the masses 12, 31 are shown in FIG. 1 as having level upper surfaces, this is for ease of illustration only. More likely than not, the upper surfaces of masses 12, 31 will be irregular, possibly having the shape of an inverted cone as particles enter the chamber 11 or 30.

In system section 10, particles flow from chamber 11 to chamber 30 through a duct or cylinder 20 for successive stages of processing. Chamber 11 has one or more inlets, not shown, for introducing particles and processing materials into chamber 11.

The particles in duct 20 form a particle mass column 21 that completely fills the cross section of duct 20 to a height H over a substantial portion of duct 20 length and constantly moves downward at velocity $V_p$ as indicated by arrow 49. Together duct 20 and column 21 form a gas backflow blocker that when properly controlled, prevents essentially all gas backflow from chamber 30 to chamber 11.

Duct 20 should be oriented in a nearly upright position, if not a precisely vertical position. As previously mentioned, duct 20 need not be vertical, but must be sufficiently upright to allow the particle mass 21 to flow smoothly through duct 20 and to completely fill all parts of the cross section of duct 20 to at least height H.

Because of requirements or effects of the processing in each chamber 11,30, the pressure $P_l$ of gasses within chamber 11 is lower than the pressure $P_h$ of gasses within chamber 30. For some types of processing where such a pressure difference is present, it is necessary to prevent backflow of gasses from the downstream higher-pressure chamber 30 to the lower pressure upstream chamber 11. For example, the gasses introduced at the downstream chamber may contaminate the gasses at upstream chamber 11 and affect the processing of the particle mass 12. Or if chamber 11 is open to the atmosphere and chamber 30 is at a higher pressure than atmospheric, it may be necessary to prevent gasses in chamber 30 from escaping to the atmosphere.

In use, duct 20 is filled with a particle mass provided from chamber 11. As the process operates, gravity moves column 21 downward at velocity $V_p$ as indicated by arrow 49. As will be explained, the downward movement of particle mass in duct 20 forms a gas backflow blocker preventing backflow of gasses from chamber 30 to an upper end of chamber 11.

A first rotary gate 27 serving as a particle mass flow restrictor or regulator connects the outlet of chamber 11 to upper end of duct 20 meters and controls volume flow rate of particles at 13 from mass 12 into duct 20. The particles at 13 are shown with lighter shading to denote the lower density of the falling particle stream. Flow of particles through gate 27 is substantially continuous, although the design of gate 27 may cause minor variations in instantaneous flow rate.

The particle volume flow rate at 13 depends on the speed at which gate 27 rotates. The flow of particles from particle mass 12 into duct 20 forms the particle mass column 21 within duct 20. As is normal, a typical rotary gate 27 provides only modest resistance to backflow of gasses from duct 20 to chamber 11.

The use of a rotary gate 27 at the top of duct 20 may be optional. In processes operating at atmospheric pressure, no gate at all may be required so long as the process in chamber 11 provides an adequate volume of particles to satisfy the requirements of the process within chamber 30.

A second rotary gate 37 serving as a second flow restrictor connects the lower end of duct 20 to an inlet of chamber 30, and meters and controls the flow of particles at 33 from column 21 into chamber 30. The speed at which gate 37 rotates controls the volume flow rate of the particle mass at 33. Rotary gate 37 too provides only modest resistance to backflow of gasses from chamber 30 to duct 20. The particles at 33 are shown with lighter shading to denote the lower density of the falling particle stream. Flow of particles through gate 27 is substantially continuous, although the design of gate 27 may cause minor variations in instantaneous flow rate.

A rotary gate 37 to regulate flow the flow rate of particles from duct 20 is only one type of device available for this purpose. Certain augers and slide-type chute flow controls may also provide similar function. I prefer a rotary gate because the ability to resist backflow may be useful in starting the process. The backflow resistance may limit fluidization of column 21 during process startup.

The volumetric flow rate of particles through at least one of the rotary gates 27 and 37 must be controllable. If gate 27 has this capability, a flow rate signal carried on path 50 regulates the rate at which the particle mass at 13 flows through gate 27. If gate 37 has this capability, a flow rate signal carried on path 51, shown in dotted line to indicate it as optional, controls the rate at which the particle mass at 33 flows through gate 37.

A level sensor 40 mounted near the upper end of duct 20 senses the height H of the column 21 within duct 20 and provides a level signal indicating column 21 height on a data path 47. A preferred embodiment for level sensor 40 uses capacitance changes resulting from changes in the dielectric constant for a pair of capacitors having plates between which flow particles forming column 21. The change in capacitance can be electronically detected in a number of well-known ways. For example, one possible type of sensor has one capacitor mounted a short distance above another. Such capacitively-based sensors are commercially available from a variety of sources.

Figure 2:
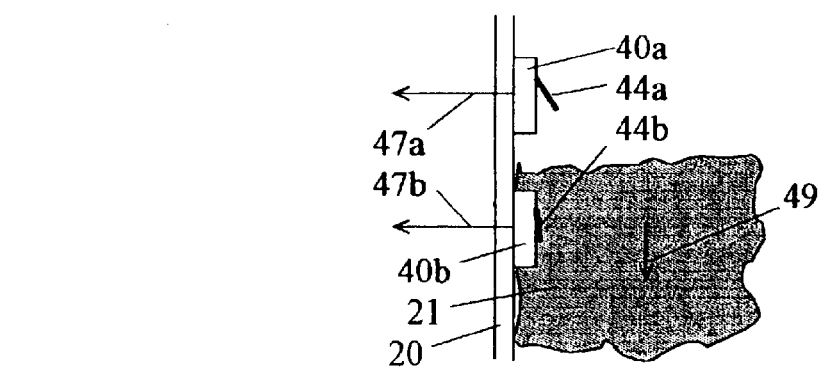
FIG. 2 is a detail of a level sensor.

For explanatory purposes, sensor 40 is shown in FIG. 2 as comprising a pair of switches 40a and 40b, switch 40a being mounted within duct 20 near the upper end thereof and a short distance above switch 40b. Switches 40a and 40b have activator levers 44a and 44b respectively. When column 21 is moving downward within duct 20, the force of the moving particle mass closes the switches 40a and 40b when column 21 is above the respective switch lever 44a and 44b. The status of switches 40a and 40b (open or closed) is indicated by wires 47a and 47b that together form data path 47.

A controller 42 receives the level signal on path 47 and regulates the rate at which particles exit container 12 into duct 20. A number of possible control process options are available. In a first option, controller 42 regulates the speed at which rotary gate 27 operates and the speed for rotary gate 37 is fixed.

In a second option, controller 42 regulates the speed at which rotary gate 37 operates and the speed for rotary gate 27 is fixed. In a third option, controller 42 regulates the speed at which both rotary gates 27 and 37 operate. The third option provides an opportunity for controller 42 to manage other parameters for the overall process, and may often be preferred.

Assuming the first option, rotary gate 37 is set to a speed suitable for operating the process stage within chamber 30, as well as for meeting the parameters to be discussed below in regard to the velocity $V_p$ at which particles flow downwards, as indicated by arrow 49. Controller 42 then adjusts the speed for gate 27 to keep switch 40b closed and switch 40a open.

This may be done with an on-off type of control, or with a more sophisticated PID algorithm. In general, once the process is operating, controller 42 regulates the speed of rotary gate 27 so that the volume rate of particle mass flow at 13 is the same as the particle mass flow from duct 20 at 33, thereby maintaining approximately a constant height for column 21 in duct 20 as set by the position of sensor 40 within duct 20.

Three important parameters must be determined for every installation using this invention. These are height H of particle mass 21, volumetric flow rate $F_p$ of the particle mass at 13 and 33, and the cross sectional area A of duct 21. For a given type of particle mass, properly specifying these values results in the desired performance.

Sensor 40 should be placed at a point in duct 20 that will maintain an adequate height H of particle mass 21. Where duct 20 is not vertical, H indicates the proper elevation of the upper end of column 21 relative to the lower end of column 21.

The proper height H in in. of particle mass column 21 is a function of the difference between $P_h$ and $P_l$, the effective mass density D of the particle mass in column 21, and possibly, the permeability of the particle mass which is a function of the particles themselves. If the particle mass effective density D is measured in lb./in.$^3$ and $P_h$ and $P_l$ are measured in psi., then $H \geq (P_h-P_l)/D$ (Eq. 1) theoretically defines a value of H in in. that prevents the pressure difference from actually lifting and possibly fluidizing column 21.

Friction between the walls of duct 20 and column 21 will further oppose downward sliding of column 21, meaning that a safety factor is necessary. I think that perhaps another 30% increase in H will typically be sufficient.

Duct 20 should be constructed to reduce friction between the walls of duct 20 and column 21 as much as possible. The interior wall of duct 20 should have few if any deviations from smoothness and should have a significant portion that is straight and parallel as shown between the top and bottom. Duct 20 should have a circular cross section to minimize the wall contact surface for column 21. Ideally, the interior walls of duct 20 are coated with a Teflon (Reg. trademark) or other anti-stick layer 22.

As an example, if $P_h-P_l=5$ psi. and D=31 lb/ft.$^3$ (half the density of water) then Eq. 1 yields $H \geq 23.2$ ft. Adding the 30% safety factor suggests that a suitable value of H for this example is 30 ft. Many large particle-processing systems can operate with such an elevation of the upper end of column 21 relative to the lower end of column 21.

Permeability PM is a factor affecting the velocity $V_g$ relative to the particles in column 21, at which gasses within chamber 30 move upwards through column 21 by percolating through and between particles in column 21 because of the pressure gradient across column 21. If the assumption is made that PM is approximately constant for a range of values for both $P_h-P_l$ and H, then an experimental setup can be used to determine for the type of particle mass to be processed, an approximate value for PM with the equation $PM=(P_h-P_l)/(H \times V_g)$. (Eq. 2) Convenient values for $P_h-P_l$ and H can be used to determine $V_g$ experimentally and PM then calculated.

Permeability is most simple to measure experimentally using the previous equation. Theoretical calculation is difficult, since a variety of factors affect permeability, such as particle size and shape, particle temperature, and gas viscosity. For example, permeability normally falls as the average size of the particles falls since the gas flows through smaller areas where boundary effects are greater. Particle temperature affects gas viscosity, and of course different gasses have different viscosities at the same temperature.

$V_g$ is important, since effective sealing of chamber 11 against gaseous backflow from chamber 30 requires that the downward velocity $V_p$ indicated by arrow 49 of the column 21 particles exceed $V_g$. At this writing, experimental measurements of PM are not available but will be easy for anyone with a modest amount of experience to make.

The cross section area A of duct 20 and volumetric rate $F_p$ of particle flow through opening 33 define velocity $V_p=F_p/A$ (Eq. 3) of particles in column 21 as they move downwards toward opening 33. Once PM has been determined for the particular particle mass type, then the equation $F_p/A \geq D \times PM$ can be used to determine the ratio $F_p/A$. When $F_p$ and A satisfy this inequality then the particle velocity $V_p$ will exceed $V_g$ and thus be high enough to provide the desired sealing of chamber 11 from chamber 30.

In addition, each type of particle mass has a fluidization velocity $V_{gf}$ for gas flow. When $V_g > V_{gf}$, the flow of gas through the particle mass is so fast that individual particles separate from each other to form a dense dust. Gas flows very rapidly through a fluidized particle mass as compared to a compacted particle mass such as column 21. The invention relies on the presence of a compacted particle mass column 21.

$V_{gf}$ depends on a number of factors: $V_{gf}$ increases with increasing specific gravity, increasing H, and increasing particle size. But $V_g$ also increases with increasing particle, so one cannot simply increase particle size. As a practical matter, $V_{gf}$ will also have to be determined experimentally. I believe that $V_g < 0.8\ V_{gf}$ will normally provide adequate protection against fluidization of column 21.

Available specifications for gates 27 and 37 provide a reasonably accurate value for $F_p$ as a function of rotational speed. When using gates 27 and 37 to control $F_p$, the pressure difference between chambers 11 and 30 and the height of column 21 affect $F_p$ only slightly.

Once gate 37 for example has been set to assure a suitable value for $F_p$, then controller 42 and sensor 40 must regulate the flow rate through gate 27 to maintain a column 21 height $H > (P_h-P_l)/D$. Similar analysis can determine the control algorithm if the flow rate of the other or both of gates 27 and 37 are regulated by controller 42.

When $V_p > V_g$ then the net velocity of gasses entering particle column 21 will be directed downwards, and little or none of the higher pressure gasses in chamber 30 can percolate through particle column 21 to chamber 11. Thus, the gasses within chamber 30 are almost completely excluded from chamber 11 and cannot enter or contaminate chamber 11. No other seal or airlock is required to provide this isolation.

This system may also be used to prevent backflow from chamber 11 to chamber 30 if pressure within chamber 11 is higher than in chamber 30. However, gasses in chamber 11 will be entrained within the particle mass forming column 21, so little purpose is seen at this time for using the system for sealing against downstream gas flow. It is possible however, that some processes can tolerate a certain amount of forward gas flow, but less than that normally allowed by typical rotary gates 27 and 37.

The mass flow rate of gasses entrained in the particles flowing from chamber 11 to chamber 30 is proportional to the mass flow rate of particles from chamber 11 to chamber 30. That is, the same mass of entrained gasses accompany a unit mass of the particles entraining them regardless of the particle mass flow rate. Flow rates in excess of this amount in general depend on column height and pressure difference, and are the factors that can be changed to limit the rate at which gas flows from chamber 11 to chamber 30. If in this situation the process steps in chambers 11 and 30 require certain pressures, then normally only column height can be used to limit the forward gas flow rate.

What is claim is:

1. A gas backflow blocker for use in a process treating a particle mass passing in a substantially continuous flow from a first stage of the process to a downstream second stage, said first stage to be held at a lower pressure than that of the second stage, wherein the particle mass has a density D, a first stage pressure of $P_h$, and a second stage pressure of $P_l$, and comprising:
   a) an upright duct having an upper end and a lower end, for holding a column of the particle mass flowing therethrough;
   b) first and second flow restrictors mounted at the upper and lower duct ends respectively, said first flow restrictor for receiving particles flowing from the first stage and limiting particle flow into the duct from the first stage and said second flow restrictor receiving flow from the duct and limiting particle flow from the duct into the second stage, at least one of said flow restrictors having a particle mass flow rate set by a flow rate signal;
   c) a particle level sensor mounted on the duct adjacent the upper end and providing a level signal indicating the level of particles within the duct; and
   d) a controller receiving the level signal and responsive thereto, providing a flow rate signal to the one of said flow restrictors to regulate particle flow through said flow restrictor to approximately maintain a predetermined particle mass level H within the duct at the level sensor, said controller regulating H to approximately satisfy the equation $H \geq (P_h - P_l)/D$.

2. The blocker of claim 1, wherein the particle level sensor is mounted at an elevation of approximately $H = 1.3 \times (P_h - P_l)/D$ above the lower end of the duct.

3. The blocker of claim 1, wherein the first flow restrictor is of the type whose flow rate is set by the flow rate signal.

4. The blocker of claim 1 wherein the first flow restrictor comprises a rotary gate whose speed of rotation is controlled by the flow rate signal.

5. The blocker of claim 1, wherein the second flow restrictor flow rate is set by the flow rate signal.

6. The blocker of claim 5 wherein the first flow restrictor comprises a rotary gate whose speed of rotation is controlled by the flow rate signal.

7. The blocker of claim 1, wherein the interior of the duct has an anti-stick surface.

8. A gas backflow blocker for use in a process treating a particle mass passing in a substantially continuous flow from a first stage of the process to a downstream second stage, said first stage to be held at a lower pressure than that of the second stage, wherein the pressure difference between the first and second stages creates a predetermined gas velocity $V_g$ within and relative to the particle mass in the duct, comprising:
   a) an upright duct having an upper end and a lower end, for holding a column of the particle mass flowing therethrough;
   b) first and second flow restrictors mounted at the upper and lower duct ends respectively, said first flow restrictor for receiving particles flowing from the first stage and limiting particle flow into the duct from the first stage and said second flow restrictor receiving flow from the duct and limiting particle flow from the duct into the second stage, at least one of said flow restrictors having a particle mass flow rate set by a flow rate signal, and wherein at least one of the first and second flow restrictors provides a volume flow rate providing a downward velocity $V_p$ of the particle mass in the duct, with $V_p > V_g$;
   c) a particle level sensor mounted on the duct adjacent the upper end and providing a level signal indicating the level of particles within the duct; and
   d) a controller receiving the level signal and responsive thereto, providing a flow rate signal to and to regulate particle flow through said flow restrictor to approximately maintain a predetermined particle mass level H within the duct at the level sensor.

9. The blocker of claim 8, wherein at least one of the first and second flow restrictors is set to provide a volume flow rate providing a downward velocity $V_p$ of the particle mass in the duct, with $V_p > 0.8 V_{gf}$ where $V_{gf}$ is a fluidization velocity causing the particle column to lose compactness.

10. The blocker of claim 8, wherein the controller provides a flow rate signal to one of said flow restrictors creating the volume flow rate providing the downward velocity $V_p$ of the particle mass in the duct.

11. A gas backflow blocker for use in a process treating a particle mass passing in a substantially continuous flow from a first stage of the process to a downstream second stage, said first stage to be held at a lower pressure than that of the second stage, comprising:
   a) an upright duct having an upper end and a lower end, for holding a column of the particle mass flowing therethrough;
   b) first and second flow restrictors mounted at the upper and lower duct ends respectively, said first flow restrictor for receiving particles flowing from the first stage and limiting particle flow into the duct from the first stage and said second flow restrictor receiving flow from the duct and limiting particle flow from the duct into the second stage, at least one of said flow restrictors having a particle mass flow rate set by a flow rate signal;
   c) a particle level sensor mounted on the duct adjacent the upper end and providing a level signal indicating the level of particles within the duct, wherein the distance between the lower end of the duct and the location of the particle sensor is greater than $(P_h - P_l)/D$, where $P_h$ and $P_l$ are the gas pressures at the first and second stages of the process respectively, and D is the effective mass density of the particles in the duct; and
   d) a controller receiving the level signal and responsive thereto, providing a flow rate signal to the one of said flow restrictors to regulate particle flow through said flow restrictor to approximately maintain a predetermined particle mass level H within the duct at the level sensor.

* * * * *